US 8,876,411 B2

(12) United States Patent
Miller (10) Patent No.: US 8,876,411 B2
(45) Date of Patent: Nov. 4, 2014

(54) METHOD FOR PERFORMING POWER MANAGEMENT IN AN ACTIVE OPTICAL CABLE (AOC)

(71) Applicant: Avago Technologies General IP (Singapore) Pte. Ltd., Singapore (SG)

(72) Inventor: Frederick W. Miller, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/954,075

(22) Filed: Jul. 30, 2013

(65) Prior Publication Data

US 2013/0318385 A1 Nov. 28, 2013

Related U.S. Application Data

(62) Division of application No. 13/013,243, filed on Jan. 25, 2011, now Pat. No. 8,534,931.

(51) Int. Cl.
*G02B 6/36* (2006.01)
*G06F 1/32* (2006.01)
*G02B 6/42* (2006.01)

(52) U.S. Cl.
CPC .............. *G06F 1/32* (2013.01); *G02B 6/4214* (2013.01); *G02B 6/4228* (2013.01); *G02B 6/4284* (2013.01)
USPC ............... 385/89; 385/92; 385/100; 713/321; 713/323

(58) Field of Classification Search
USPC ........ 385/14, 89, 92, 100; 713/300, 320, 321, 713/323, 340
See application file for complete search history.

(56) References Cited

U.S. PATENT DOCUMENTS

| 8,083,417 | B2* | 12/2011 | Aronson et al. | 385/92 |
|---|---|---|---|---|
| 8,403,571 | B2* | 3/2013 | Walker | 385/88 |
| 8,534,931 | B2* | 9/2013 | Miller | 385/92 |
| 2007/0049120 | A1 | 3/2007 | Hemmah | |
| 2007/0122086 | A1 | 5/2007 | Lin | |
| 2009/0067853 | A1 | 3/2009 | Cunneen et al. | |
| 2009/0111524 | A1 | 4/2009 | Basaralu | |
| 2009/0196621 | A1 | 8/2009 | Chen | |
| 2010/0049881 | A1* | 2/2010 | Manor et al. | 710/18 |
| 2010/0166431 | A1 | 7/2010 | Wu et al. | |

FOREIGN PATENT DOCUMENTS

| EP | 1431787 | 6/2004 |
|---|---|---|
| EP | 2088514 | 8/2009 |

* cited by examiner

*Primary Examiner* — Daniel Petkovsek (57) ABSTRACT

An active optical cable is provided that incorporates a power management solution. The AOC has plugs are configured to mate with respective USB sockets. The AOC is used to interconnect a USB host with a USB device. To the USB host and to the USB device, the AOC appears to be a standard USB electrical cable. Each of the plugs of the AOC has an optical-to-electrical and an electrical-to-optical (OE/EO) conversion module that converts electrical USB signals output from the USB host or USB device into optical signals and converts optical signals carried on the optical fibers of the AOC into electrical USB signals. The plugs include controllers that monitor certain conditions of the AOC and that select the power levels to be used in the plugs based on detected conditions.

20 Claims, 6 Drawing Sheets

FIG. 6

METHOD FOR PERFORMING POWER MANAGEMENT IN AN ACTIVE OPTICAL CABLE (AOC)

CROSS-REFERENCE TO RELATED APPLICATIONS

This application is a divisional application of U.S. application Ser. No. 13/013,243, filed on Jan. 25, 2011, entitled "AN ACTIVE OPTICAL CABLE (AOC) AND A METHOD AND APPARATUS FOR PERFORMING POWER MANAGEMENT IN THE AOC," which has issued as U.S. Pat. No. 8,534,931, and which is hereby incorporated herein by reference in its entirety.

TECHNICAL FIELD OF THE INVENTION

The invention relates to active optical cables (AOCs). More particularly, the invention relates to a method for performing power management in an AOC.

BACKGROUND OF THE INVENTION

Power management schemes are used in active electrical cables to adjust the power levels of active components (e.g., amplifiers) of the electrical circuits of the plugs disposed on the ends of the cables. Such power management schemes adjust the power levels based on certain detected conditions, such as, for example, whether the plugs are currently plugged into their respective sockets, whether low-speed signals are being transmitted over the cable, and whether high-speed signals are being transmitted over the cable.

An AOC is an optical fiber cable that is terminated on each end with a plug that contains an optical transceiver module that converts optical signals into electrical signals and electrical signals into optical signals. The plugs on the ends of the optical fiber cable have housings that are configured to be received within sockets of devices that are being interconnected by the AOC. Mechanical coupling features on the respective plug housings interlock with mechanical coupling features of the respective sockets to secure the respective plug housings to the respective sockets.

While few power management methods have been proposed for use in AOCs, those that have been proposed typically require an additional serial port or dedicated low-speed signaling pins to control the power levels of the active optical devices of the AOC plugs. Consequently, the plugs of the AOCs will not mate with standard sockets, such as standard USB or USB 3 sockets, but only with sockets that are customized to mate with the AOC plugs.

A need exists for an AOC that implements a power management solution and that has plugs that are configured to mate with standard USB or USB 3 sockets.

SUMMARY OF THE INVENTION

The invention is directed to a method for use in an AOC for performing power management. The AOC comprises an optical fiber cable and first and second plugs secured to proximal and distal ends, respectively, of the optical fiber cable. The optical fiber cable has at least a first transmit optical fiber having proximal and distal ends and at least a first receive optical fiber having proximal and distal ends. The first and second plugs have first and second plug housings configured to mate with respective Universal Serial Bus (USB) sockets, respectively. The first and second plug housings have first and second optical-to-electrical and electrical-to-optical (OE/EO) conversion modules, respectively, first and second electrical power and signal (EPS) detection circuitry, respectively, and first and second controllers, respectively, disposed therein. The first and second EPS detection circuitries are electrically coupled to the first and second controllers, respectively. The first OE/EO conversion module is optically coupled to the proximal ends of the first transmit and receive optical fibers and to the first EPS detection circuitry. The second OE/EO conversion module is optically coupled to the distal ends of the first transmit and receive optical fibers and to the second EPS detection circuitry.

The method comprises performing respective power management algorithms if the first and second controllers. In the first controller, the power management algorithm processes output signals from the first EPS circuitry to determine which of a plurality of different predetermined signal types is currently being detected by the first EPS detection circuitry. The first controller causes the first plug to be placed in a selected power state of a first set of predetermined power states based on which of the predetermined signal types is currently being detected by the first EPS detection circuitry. In the second controller, the power management algorithm processes output signals from the second EPS detection circuitry to determine which of a plurality of different predetermined signal types is currently being detected by the second EPS detection circuitry. The second controller causes the second plug to be placed in a selected power state of a second set of predetermined power states based on which of the predetermined signal types is currently being detected by the second EPS detection circuitry.

The power management algorithm may be implemented in computer instructions stored in a computer-readable medium (CRM). The computer instructions include a first set of computer instructions for execution by a first controller of the first plug of the AOC to determine which of a plurality of predetermined signal types is currently being detected by EPS detection circuitry of the first plug and to cause the first plug to be placed in a selected power state of a first set of predetermined power states based on which of the predetermined signal types is currently being detected by the first controller.

These and other features and advantages of the invention will become apparent from the following description, drawings and claims.

DETAILED DESCRIPTION OF AN EXEMPLARY EMBODIMENT

The invention is directed to a method and apparatus for performing power management in an AOC that has plugs that are configured to mate with a standard USB socket. The phrases "standard USB" or "USB standard", as those phrases are used herein, are intended to denote any existing USB standard, including the USB 1, USB 2 and USB 3 standards, as well as USB standards developed in the future. The AOC is used to interconnect a USB host with a USB USB device. To the USB host and to the USB device, the AOC appears to be a standard USB electrical cable. Each of the plugs of the AOC has an optical-to-electrical and an electrical-to-optical (OE/EO) conversion module that converts electrical USB signals output from the USB host or USB device into optical signals and converts optical signals carried on the optical fibers of the AOC into electrical USB signals. The power management method and apparatus manage the power levels of the AOC based on certain detected conditions, as will now be described with reference to an illustrative, or exemplary, embodiment. Prior to describing the power management method and apparatus, the AOC in which they are incorporated will be described with reference to FIGS. 1-3. The power management method and apparatus will then be described with reference to FIGS. 4-6.

Figure 1:
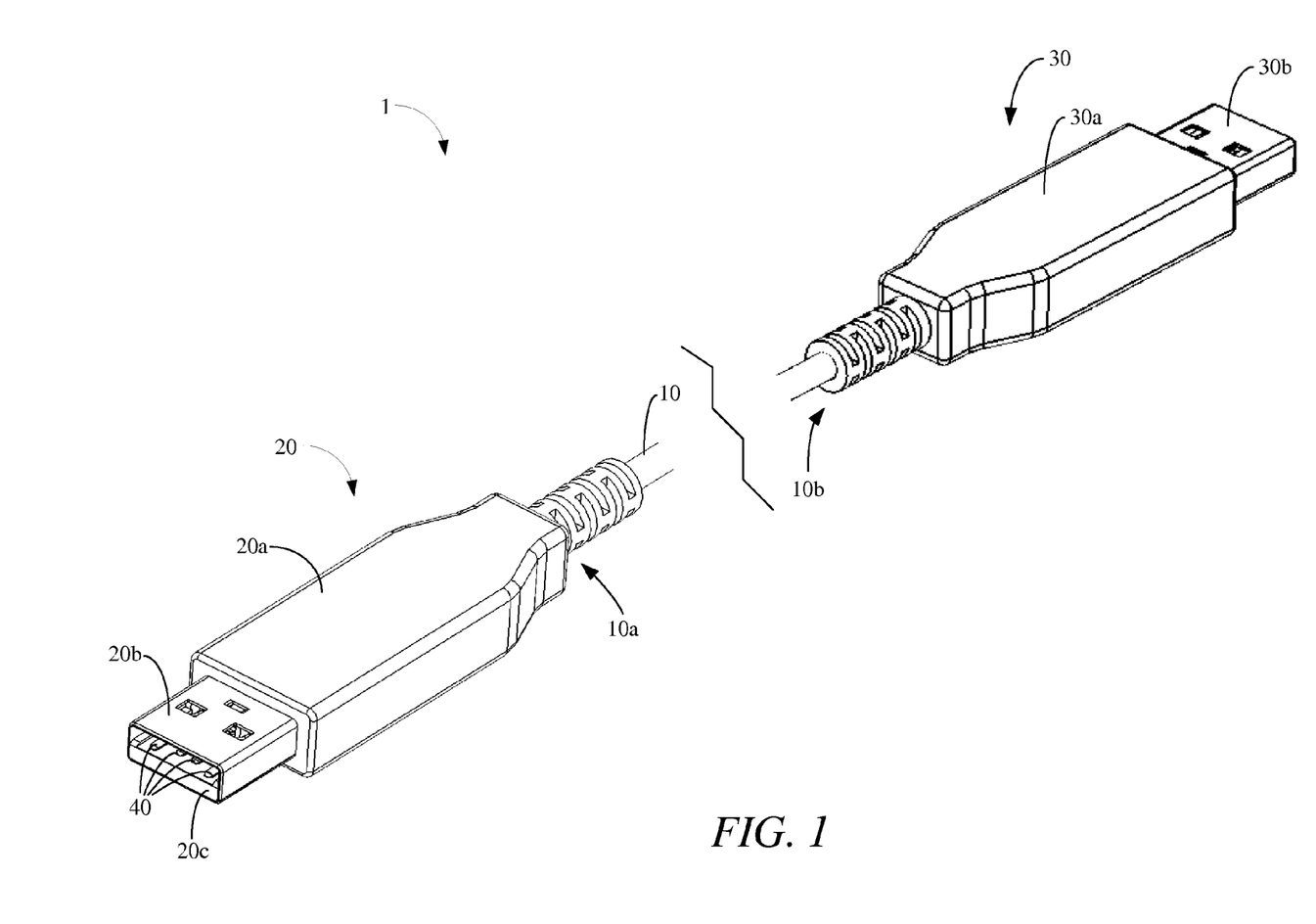
FIG. 1 illustrates a perspective view of an illustrative embodiment of an AOC that implements the power management method and apparatus of the invention.

FIG. 1 illustrates a perspective view of an AOC 1 in accordance with an illustrative embodiment. The AOC 1 has an optical fiber cable 10 and first and second plugs 20 and 30 that terminate opposite ends 10a and 10b of the cable 10. For exemplary or illustrative purposes, it will be assumed that plug 20 is mated with a socket of a USB host (not shown for purposes of clarity) and that plug 30 is mated with a socket of a USB device (not shown for purposes of clarity). The plugs 20 and 30 have identical mechanical, electrical and optical configurations. The plugs 20 and 30 have molded plastic bodies 20a and 30a, respectively, shaped to allow a user to easily grip the plugs 20 and 30 and plug them into the sockets of the USB host and USB device. The molded plastic bodies 20a and 30a partially encompass metal USB housings 20b and 30b of the plugs 20 and 30, respectively. Respective sets of electrical USB contacts 40 are disposed within the respective USB housings 20b and 30b. When the plugs 20 and 30 are mated with respective sockets of a USB host and of a USB device, the respective sets of electrical USB contacts 40 of the plugs 20 and 30 are electrically coupled with respective sets of USB electrical contacts of the USB host and USB device.

Figure 2:
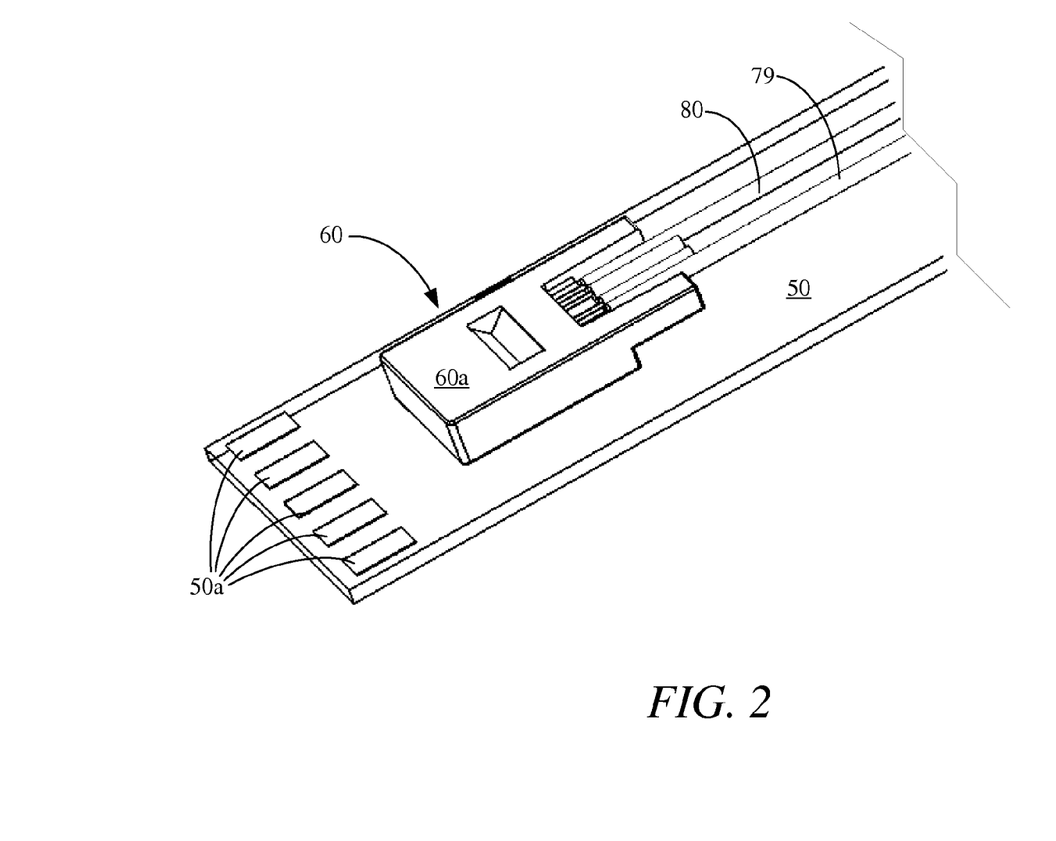
FIG. 2 illustrates a top perspective view of a printed circuit board (PCB) that is disposed within each of the metal USB housings shown in FIG. 1 and having an optical-to-electrical and electrical-to-optical (OE/EO) conversion module mounted thereon.

FIG. 2 illustrates a top perspective view of a printed circuit board (PCB) 50 that is disposed within each of the metal USB housings 20b and 30b shown in FIG. 1. For purposes of discussion, it will be assumed that the PCB 50 shown in FIG. 2 is within plug 20. An identical PCB is within plug 30, but will not be described herein in the interest of brevity. The PCB 50 has electrical contact pads 50a disposed thereon that are electrically coupled via electrical conductors (not shown for purposes of clarity) to the electrical USB contacts 40 (FIG. 1). An OE/EO conversion module 60 is mounted on the PCB 50. The OE/EO conversion module 60 includes a lens assembly 60a and other elements that cannot be seen in FIG. 2 because they are positioned beneath the lens assembly 60a on the PCB 50. A receive optical fiber 79 and a transmit optical fiber 80 of the optical fiber cable 10 shown in FIG. 1 have ends (not shown for purposes of clarity) that are connected to the OE/EO conversion module 60. Electrical traces (not shown for purposes of clarity) of the PCB 50 connect electrical circuitry of the OE/EO conversion module 60 to the electrical contact pads 50a.

Optical signals carried on the receive optical fiber 79 are converted by the OE/EO conversion module 60 into electrical USB signals, which are then coupled to the USB host via the connection between the electrical contact pads 50a and the electrical USB contacts 40 (FIG. 1). Electrical USB signals output from the USB host are coupled to the OE/EO conversion module 60 via the connection between the electrical USB contacts 40 (FIG. 1) and the electrical contact pads 50a. The OE/EO conversion module 60 then converts the electrical USB signals into optical signals and couples the optical signals into the end of the transmit optical fiber 80.

Figure 3:
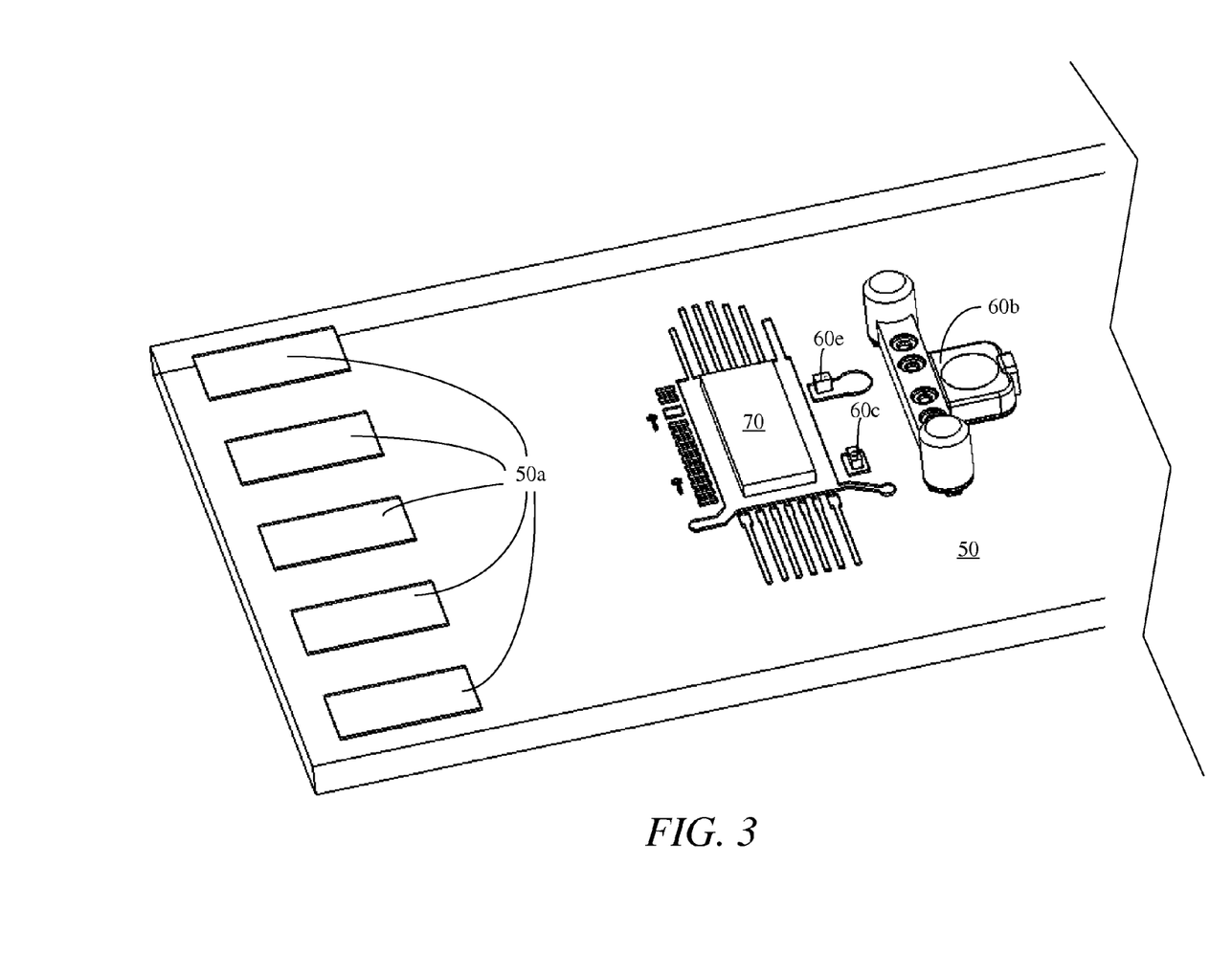
FIG. 3 illustrates a top perspective view of the PCB shown in FIG. 2 with a lens assembly of the OE/EO conversion module removed to allow other elements of the OE/EO conversion module to be seen.

FIG. 3 illustrates a top perspective view of the PCB 50 shown in FIG. 2 with the lens assembly 60a removed to allow the other elements of the OE/EO conversion module 60 that are mounted on the PCB 50 to be seen. A keying device 60b of the OE/EO conversion module 60 is configured to mate with the lens assembly 60a in a particular manner to accurately position the lens assembly 60a on the PCB 50. Optical signals received in the lens assembly 60a from the receive optical fiber 79 are coupled onto an optical-to-electrical (OE) conversion element 60c of the OE/EO conversion module 60. The OE conversion element 60c is typically a photodiode. The OE conversion element 60c converts the optical signal into an electrical analog signal, which is then processed by other electrical circuitry (not shown for purposes of clarity) and digitized. A controller integrated circuit (IC) 70 receives the digitized signal and processes it in accordance with the power management algorithm described below with reference to FIGS. 4-6, and possibly other algorithms that are not associated with power management. In accordance with this illustrative embodiment, the controller IC 70 performs both the transmitter (Tx) and the receiver (Rx) controller operations, although these could be performed in separate controller ICs. As will be described below in more detail with reference to FIGS. 4-6, the controller IC 70 is part of the power management apparatus that performs the power management method.

The controller IC 70 is connected via conductive traces (not shown for purposes of clarity) of the PCB 50 to the electrical contact pads 50a. Electrical USB signals output from the USB host are coupled to the controller IC 70 via the conductive traces that connect the electrical contact pads 50a to the controller IC 70. The controller IC 70 produces electrical drive signals based on the electrical USB signals output by the USB host. The electrical drive signals are used to drive an electrical-to-optical (EO) conversion element 60e of the OE/EO conversion module 60. The EO conversion element 60e is typically a laser diode, such as a vertical cavity surface emitting laser diode (VCSEL), for example. In response to the electrical drive signal produced by the controller IC 70, the EO conversion element 60e produces an optical signal that is coupled by the lens assembly 60a into the end of the transmit optical fiber 80.

The EO and OE conversions described above with reference to FIG. 3 occur in the same manner in the plug 30 of the AOC 1, which, as stated above, is mated with the socket of the USB device. Thus, the USB host and the USB device communicate with each other via the AOC 1 in the same manner in which they would normally communicate with each other via a standard electrical USB cable terminated with standard USB plugs. In other words, it appears to the USB host and to the USB device that they are communicating with each other via a standard electrical USB cable.

Figure 4:
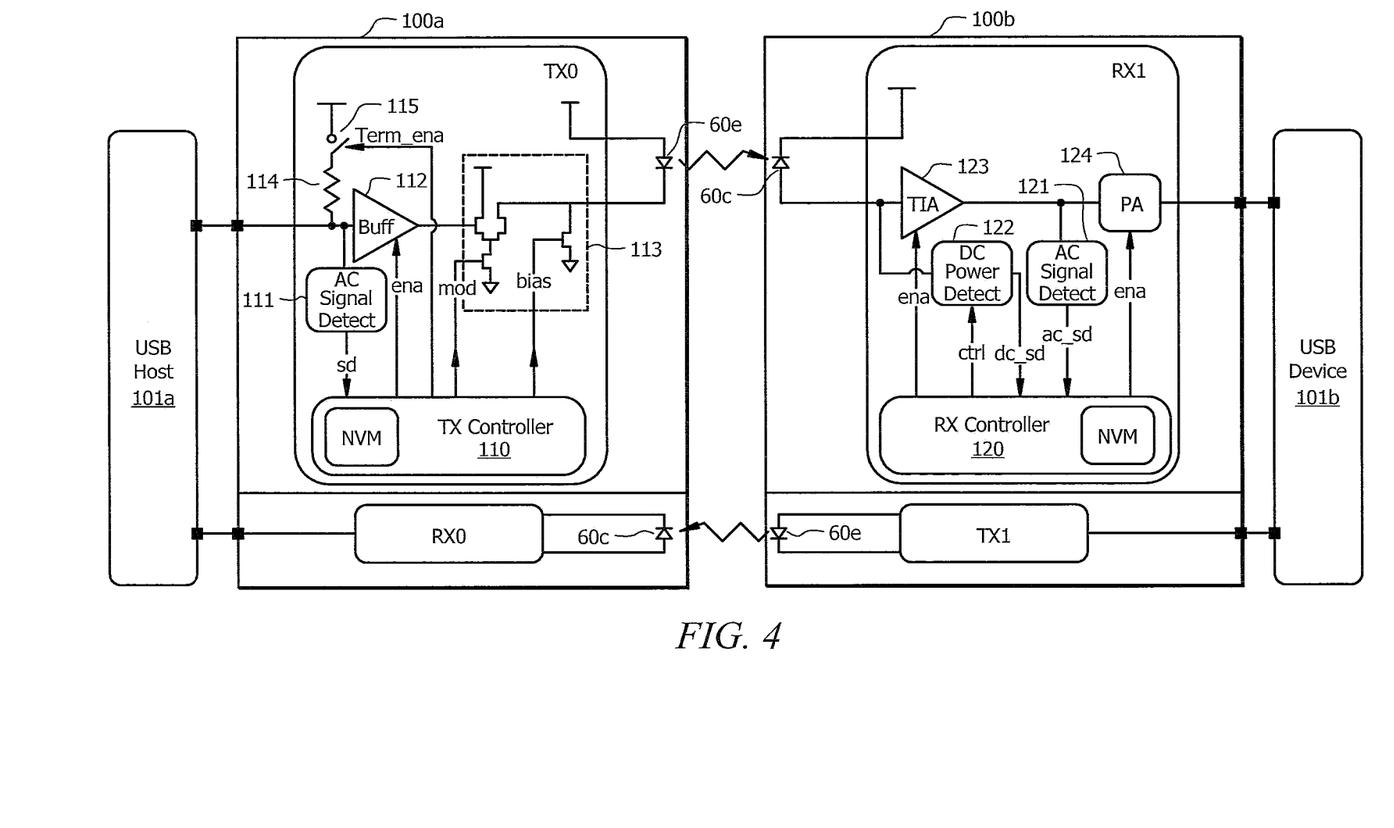
FIG. 4 is a block diagram illustrating apparatuses that perform power management methods in the plugs of the AOC shown in FIG. 1.

FIG. 4 is a block diagram illustrating apparatuses 100a and 100b that perform the power management methods in the plugs 20 and 30, respectively, shown in FIG. 1. Each of the apparatuses 100a and 100b includes the electrical and optoelectrical elements of the OE/EO conversion module 60 and the controller IC 70 shown in FIG. 3. Thus, each of the apparatuses 100a and 100b includes the controller IC 70 and the OE and EO conversion elements 60c and 60e. The apparatuses 100a and 100b are identical to each other. The apparatus 100a is electrically coupled to the USB host 101a. The apparatus 100b is electrically coupled to the USB device 101b. The apparatus 100a include a Tx portion, Tx0, an Rx portion, Rx0, and the OE and EO conversion elements 60c and 60e, respectively, shown in FIG. 3. The Tx portion, Tx0, includes a Tx controller 110, an alternating current (AC) signal detector 111, a buffer circuit 112, modulation and bias current control circuitry 113, a variable input termination resistor 114, and a switch 115.

The apparatus 100b includes an Rx portion, Rx1, a Tx portion, Tx1 and the OE and EO conversion elements 60c and 60e, respectively, shown in FIG. 3. The Rx portion, Rx1, includes an Rx controller 120, an AC signal detector 121, a direct current (DC) power detector 122, a transimpedance amplifier circuit (TIA) 123, and a power amplifier circuit (PA) 124. The Rx portion, Rx0 of the apparatus 100a is identical to the Rx portion, Rx1, of the apparatus 100b. The Tx portion, Tx1 of the apparatus 100b is identical to the Tx portion, Tx0, of the apparatus 100a.

The USB 3 standard defines a Low Frequency Periodic Signaling (LFPS) protocol that can be used by the USB 3 host and USB 3 device to determine when a transition is to be made from one of four primary power states to another of the four primary power states. In order to determine which of the primary power states the USB 3 host and the USB 3 device should be in in at any given time, an LFPS signal is communicated between the USB 3 host and the USB 3 device and analyzed on each end of the link to determine whether and when a transition from one power state to another is to occur.

In accordance with the invention, the LFPS signals are detected and analyzed by the apparatuses 100a and 100b to determine whether the AOC 1 is to be in one of four primary power states: (1) a SLEEP state; (2) a WAIT state; (3) an LFPS state; and (4) an ACTIVE state. The SLEEP state is a state in which a first power level corresponding to a minimum level of power is used while the link is monitored to detect insertion of the plug at the far end of the AOC 1. The WAIT state is a state in which a second power level that is slightly higher than the first power level is used after that apparatus 100a or 100b has detected insertion of the plug 20 or 30 at the far end of the AOC 1 and is waiting to receive LFPS signals. The LFPS state is a state in which a third power level is used that is slightly higher than the second power level after the apparatus 100a or 100b has detected LFPS signaling and is preparing to transmit and receive LFPS signaling. The ACTIVE state is a state in which a fourth power level that is higher than the third power level is used when the AOC 1 is ready for full, high-speed data transmission. The differences between the power levels of these different power states is attributed to the number and type of electrical circuit blocks of the Rx and Tx portions that are enabled or disabled and to the levels of the bias and modulation currents that are applied to the EO conversion elements 60e via the modulation and bias current control circuitry 113. The apparatuses 100a and 100b control which circuit blocks are enabled or disabled in the plugs 20 and 30 as well as the modulation and bias current control circuitry 113. In this way, the amount of electrical power that is consumed or dissipated by AOC 1 is managed or controlled.

Figure 5:
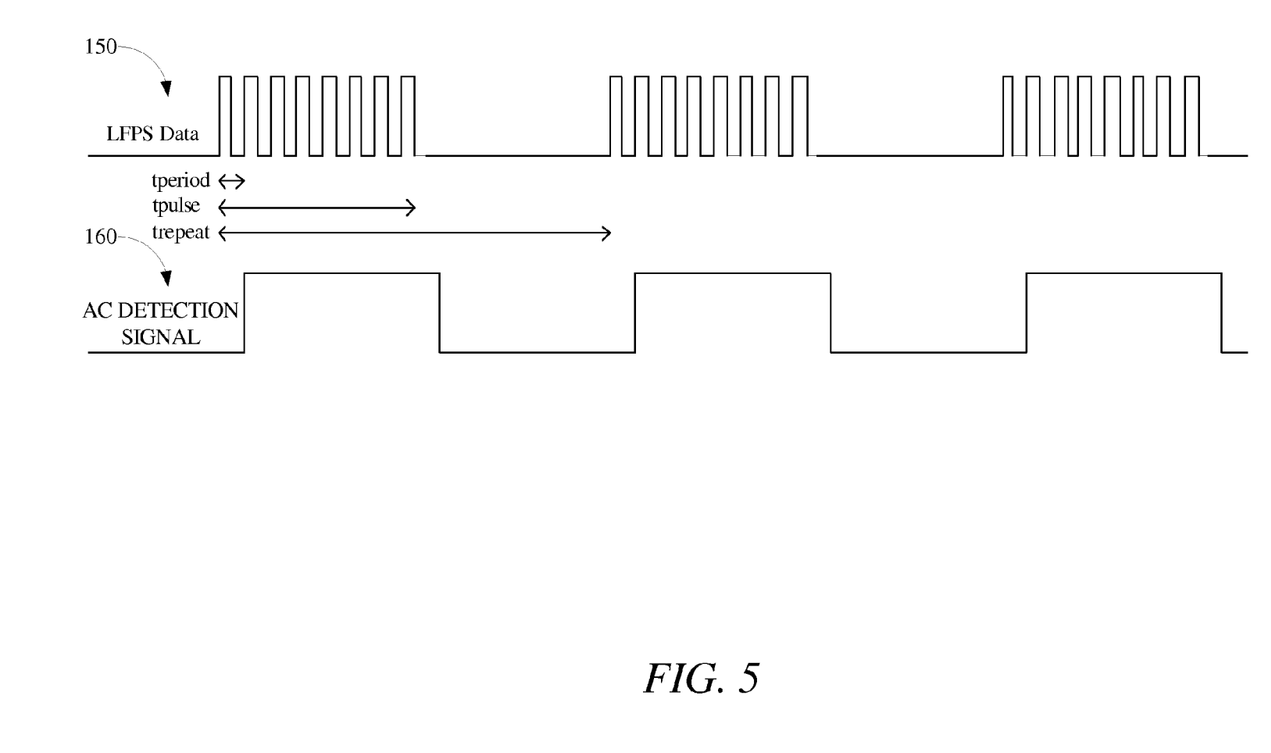
FIG. 5 illustrates a timing diagram of a Low Frequency Periodic Signaling (LFPS) protocol signal of the type that is typically transmitted between a USB 3 host and a USB 3 device to perform power management in accordance with the USB 3 standard.

FIG. 5 illustrates a timing diagram of an LFPS signal 150 of the type that is typically transmitted between a USB 3 host and a USB 3 device to perform power management in accordance with the USB 3 standard. It will be assumed that the LFPS signal 150 shown in FIG. 5 is transmitted between the USB host 101a (FIG. 4) and the USB device 101b (FIG. 4) to control transitions of the AOC 1 between the four primary power states. Because it is unnecessary for the apparatuses 100a and 100b to decode the LFPS signals, the apparatuses 100a and 100b detect the LFPS signals and pass them along to the USB host 101a and the USB device 101b, but do not decode the LFPS signals.

The LFPS signal 150 is a relatively low-frequency, square-wave-modulated signal with a defined frequency (tperiod). The LFPS signal 150 is transmitted in bursts of a defined length (tpulse) and repeated at a defined interval (trepeat). The parameters tpulse and trepeat are used to convey power management information from one end of the link to the other. This allows the link to be maintained while consuming the low or minimal amounts of power. As will be described below in more detail, the AC signal detectors 111 and 121 detect these LFPS signal bursts and convey information to the Tx and Rx controllers 110 and 120, which then use this information to cause the AOC 1 to be placed in the proper one of the four primary power states.

FIG. 5 also illustrates the output signal 160 of the AC signal detectors 111 and 121. The output signal 160 transitions to the high state when the AC signal detector 111 or 121 detects a few transitions of the LFPS signal 150 between the high and low states at the frequency corresponding to tperiod. The range of tperiod for LFPS signaling is 20 nanoseconds (ns) to 100 ns (10 megahertz (MHz) to 50 (MHz)) while a high-speed data period is much shorter (e.g., 100 picoseconds (ps)). The AC signal detectors 111 and 121 may implement a high-speed edge detector that detects signal transitions and a counter that increments each time a transition is detected. Based on the value of the counter and the time period over which the transitions are counted, the AC signal detectors 111 and 121 can determine if the signaling is LFPS signaling or a high-speed training pattern or data stream.

The output signal 160 remains high until the AC signal detector 111 or 121 detects an absence of transitions of the LFPS signal 150 at the frequency corresponding to tperiod. The Tx controller 110 analyzes the output signal 160, labeled "sd" in FIG. 4, to determine when LFPS signaling is and is not occurring. If the AC signal detector 111 or 122 does not detect a subsequent burst of the LFPS signal within the trepeat interval, then the Tx controller 110 or Rx controller 120 will determine, based on the value of sd or ac_sd, respectively, that LFPS signaling is no longer occurring.

With reference again to apparatus 100a shown in FIG. 4, when the plug 20 is inserted into the socket (not shown for purposes of clarity) of the USB host 101a, the Tx controller 110 causes the modulation and bias current control circuitry 113 to set the modulation and bias currents of the EO conversion element 60e at levels that cause it to emit a low-frequency, low-power optical signal. The switch 115 is disabled by the Tx controller 110 to prevent electrical current from passing through the resistor 114. This causes the USB host 101a to detect a relatively high impedance, which indicates to the USB host 101a that the plug 30 has not been inserted into the USB device 101b at the far end of the link. The switch 115 is typically a metal oxide semiconductor field effect transistor (MOSFET) switch, although a variety of other switches may be used for this purpose.

The OE conversion element 60c of the apparatus 100b detects the low-frequency, low-power optical signal emitted by the EO conversion element 60e of the apparatus 100a and produces a corresponding low-frequency, low-power electrical signal, which is input to the DC power detector 122. The DC power detector 122 detects the presence of this electrical signal and outputs a corresponding indication, dc_sd, to the Rx controller 120. Assertion of dc_sd informs the Rx controller 120 that the plug 20 has been inserted into the socket of the USB host 101a. In like manner, the Rx portion, Rx0, of the apparatus 100a detects whether the plug 30 has been inserted into the socket of the USB device 101b.

Once the Rx controllers 110 of the Rx portions Rx0 and Rx1 have determined that the plugs 20 and 30 at the opposite ends of the link have been inserted into their respective sockets, the respective Tx controllers 110 cause the respective switches 115 to be closed. Closing the switches 115 causes the USB host 101a and the USB device 101b to see reduced impedances due to the electrical currents flowing through the resistors 114. The reduced impedances seen by the USB host 101a and the USB device 101b inform them that the AOC 1 is plugged in on both ends of the link.

Having described the manner in which the apparatuses 100a and 100b detect the LFPS signal 150 and determine when the plugs 20 and 30 have been plugged into the sockets of the USB host 101a and the USB device 101b, respectively, the manner in which power management is performed by the apparatuses 100a and 100b will now be described with reference to FIG. 6.

Figure 6:
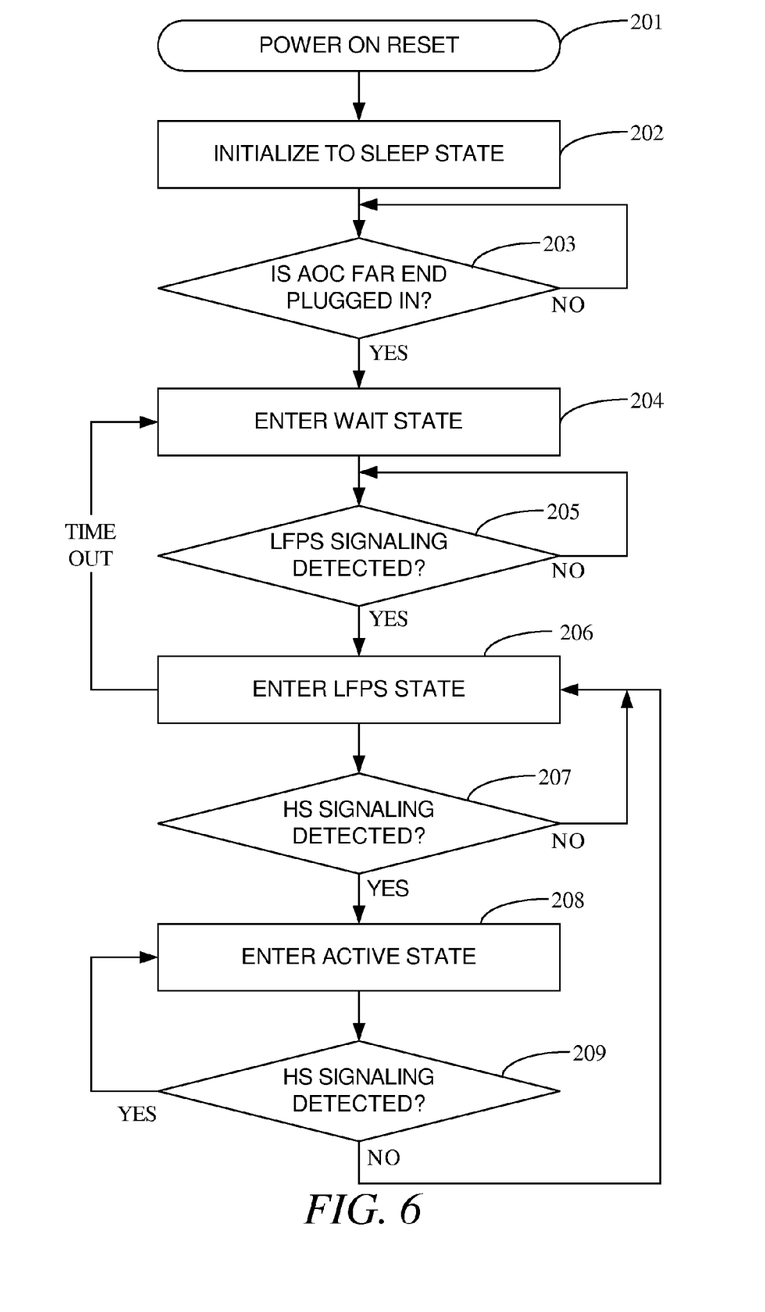
FIG. 6 illustrates a flowchart that represents the power management method performed by each of the apparatuses shown in FIG. 4.

FIG. 6 illustrates a flowchart that represents the power management method performed by each of the apparatuses 100a and 100b shown in FIG. 4. Because the apparatuses 100a and 100b perform identical power management methods, or algorithms, the power management method will be described only with reference to the apparatus 100a. When the apparatus 100a is powered on at block 201, the apparatus 100a enters the SLEEP state by default, as indicated by block 202. The apparatus 100a is powered on when the plug 20 is plugged into the socket of the USB host 101a. While in the SLEEP state, the apparatus 100a continuously or periodically checks to determine whether the plug 30 has been plugged into the socket of the USB device 101b, as indicated by block 203. The apparatus 100a remains in the SLEEP state until a determination is made at block 203 that the plug 30 has been plugged into the socket of the USB device 101b.

When the apparatus 100a determines that the plug 30 has been plugged into the socket of the USB device 101b, the apparatus 100a enters the WAIT state, as indicated by block 204. When the apparatus 100a enters the WAIT state, the switch 115 is closed to indicate to the USB host 101a that the plug 30 has been plugged into the socket of the USB device 101b. While in the WAIT state, the apparatus 100a is causing the low-frequency, low-power optical signal to be output by the EO conversion element 60e and is monitoring the output of the OE conversion element 60c for the low-frequency, low-power optical signal. In this way, the apparatus 100a verifies that plug 30 remains plugged in and that the optical fibers 79 and 80 are also intact (i.e., for purposes of eye safety, open-fiber control). In the WAIT state, the apparatus 100a also monitors the optical signals sent from Tx1 of plug 30 for LFPS signaling, as indicated by block 205. The apparatus 100a remains in the WAIT state until LFPS signaling is detected.

When the apparatus 100a detects LFPS signaling sent from Tx1 of plug 30, the apparatus 100a enters the LFPS state, as indicated by block 206. While in the LFPS state, the LFPS signals received in the apparatus 100a are passed to the USB host 101a. If after receiving a first burst of LFPS signals, a second burst of the LFPS signals is not received within a timeout period equal to trepeat, the apparatus 100a re-enters the WAIT state. Also while in the LFPS state, the apparatus 100a monitors the optical signals received from the Tx1 of apparatus 100b to determine whether high-speed (HS) data packets are being received, as indicated by block 207. The transmission of HS data packets is preceded by the transmission of a training sequence. As described above, the AC signal detectors 111, 121 include circuitry (not shown) for detecting LFPS signaling and the HS training sequence or HS data and for differentiating between them. When the apparatus 100a determines that the HS training sequence is being detected, the apparatus 100a enters the ACTIVE state, as indicated by block 208. While in the ACTIVE state, the apparatus 100a determines whether HS transitions have occurred within a timeout period, as indicated by block 209. If not, the apparatus 100a re-enters the LFPS state. If so, the apparatus 100a remains in the ACTIVE state.

It should be noted that a variety of modifications may be made to the power management methods and apparatuses described above within the scope of the invention. The invention is not limited to having the four primary power states described above. For example, blocks 205 and 206 in FIG. 6 may be eliminated such that the apparatuses 100a and 100b enter the ACTIVE state upon exiting the WAIT state. Alternatively, blocks 206 and 207 may be eliminated such that the apparatuses 100a and 100b exit the WAIT state and enter the ACTIVE state at block 208 upon detecting LFPS signaling at block 205. As yet another alternative, blocks 204-207 may be eliminated such that the apparatuses 100a and 100b exit the SLEEP state at block 203 upon determining that the plug 20 or 30 at the opposite end of the link has been plugged in and enter the ACTIVE state at block 208. As yet another alternative, blocks 204 and 205 may be eliminated such that the apparatuses 100a and 100b exit the SLEEP state at block 203 upon determining that the plug 20 or 30 at the opposite end of the link has been plugged in and enter the LFPS state at block 206. Other similar modifications may be made to the algorithm represented by the flowchart shown in FIG. 6 within the scope of the invention. Also, additional conditions and power states not depicted in FIG. 6 may be employed in the power management method.

The power management algorithms represented by the flowchart shown in FIG. 6 are performed by the Tx and Rx controllers 110 and 120 within the controller IC 70 (FIG. 3). Thus, these algorithms are implemented at least partially in software and/or firmware of the controller IC 70. The software and/or firmware comprise computer instructions that are stored on some sort of computer-readable medium (CRM) that is internal to or external to the controller IC 70. For example, the CRM may be a nonvolatile solid state memory device, such as, for example, a read only memory (ROM) device, programmable ROM (PROM), a erasable PROM (EPROM), a flash memory device, or a random access memory (RAM) device.

It should be noted that the invention has been described with reference to illustrative embodiments and that the invention is not limited to these embodiments. Those skilled in the art will understand the manner in which modifications can be made to the illustrative embodiments and that all such modifications are within the scope of the invention. For example, although the apparatuses 100a and 100b have been described as having particular configurations, persons skilled in the art will understand the manner in which these configurations may be modified while still achieving the goals of the invention. These and other modifications may be made to the embodiments described herein and all such modified embodiments are also within the scope of the invention, as will be understood by persons skilled in the art.

What is claimed is:

1. A method for performing power management in an active optical cable (AOC), the method comprising:
   providing an AOC comprising an optical fiber cable and first and second plugs secured to proximal and distal ends, respectively, of the optical fiber cable, the optical fiber cable having at least a first transmit optical fiber having proximal and distal ends and at least a first receive optical fiber having proximal and distal ends, the first and second plugs having first and second plug housings configured to mate with first and second sockets, respectively;
   in a first optical-to-electrical and electrical-to-optical (OE/EO) conversion module of the first plug, converting a first optical signal passing out of the proximal end of the receive optical fiber into a first electrical signal;
   in a first electrical power and signal (EPS) detection circuit of the first plug, detecting the first electrical signal and outputting a first electrical output signal;
   in a first controller of the first plug, performing a power management algorithms that processes the first electrical output signal to determine which of a plurality of different predetermined signal types is currently being detected by the first EPS detection circuit;
   with the first controller, initially placing the first plug in SLEEP states when the first plug is plugged into the first socket, wherein the first plug uses a first level of electrical power when the first plug is in the SLEEP state;
   with the first controller, placing the first plug in a WAIT state when a first signal type of the different predetermined signal types is being detected by the first EPS detection circuits, wherein the WAIT state corresponds to a second level of electrical power used by the first plug that is higher than the first level of electrical power;
   with the first controller, placing the first plug in a Low Frequency Periodic Signaling (LFPS) state when a second signal type of the different predetermined signal types is being detected by the first EPS detection circuit, wherein the LFPS state corresponds to a third level of electrical power used by the first plug that is higher than the second level of electrical power; and
   with the first controller, placing the first plug in an ACTIVE state when a third signal type of the different predetermined signal types is being detected by the first EPS detection circuits, wherein the ACTIVE state corresponds to a fourth level of electrical power used by the first plug that is higher than the third level of electrical power.

2. The method of claim 1, wherein the first level of electrical power used by the first plugs is a lowest level of electrical power used by the first plugs.

3. The method of claim 2, and wherein the respective fourth level of electrical power used by the first plug is a highest level of electrical power used by the first plug.

4. The method of claim 3, wherein if the first controller determines that the first EPS circuit is detecting the first signal type, the first controller determines that the second plug has been plugged into the second socket.

5. The method of claim 4, further comprising:
   in the first controller, determining whether the second plug has been plugged into the second socket while the first plug is in the SLEEP state by determining whether the first EPS detection circuit is detecting the first signal type, and if so, causing the first plug to exit the SLEEP state and enter the WAIT state.

6. The method of claim 5, wherein if the first controller determines that the first EPS detection circuit is detecting the second signal type, the first controller determines that the second plug is transmitting LFPS signals to the first plug.

7. The method of claim 6, further comprising:
   in the first controller, determining whether the second plug is transmitting LFPS signals to the first plug while the first plug is in the WAIT state, and if so, causing the first plug to exit the WAIT state and enter the LFPS state.

8. The method of claim 7, wherein if the first controller determines that the first EPS detection circuit is currently detecting the third signal type, the first controller determines that the second plug is transmitting high-speed (HS) data signals to the first plug.

9. The method of claim 8, further comprising:
   in the first controller, determining whether the second plug is transmitting HS data signals to the first plug while the first plug is in the LFPS state, and if so, causing the first plug to exit the LFPS state and enter the ACTIVE state.

10. The method of claim 1, further comprising:
    in a second optical-to-electrical and electrical-to-optical (OE/EO) conversion module of the second plug, converting a second optical signal passing out of the distal end of the transmit optical fiber into a second electrical signal;
    in a second electrical power and signal (EPS) detection circuit of the second plug, detecting the second electrical signal and outputting a second electrical output signal;
    in a second controller of the second plug, performing a power management algorithm that processes the second electrical output signal to determine which of said plurality of different predetermined signal types is currently being detected by the second EPS detection circuit;
    with the second controller, initially placing the second plug in the SLEEP state when the second plug is plugged into the second socket, wherein the second plug uses a first level of electrical power when the second plug is in the SLEEP state;
    with the second controller, placing the second plug in the WAIT state when the first signal type of the different predetermined signal types is being detected by the second EPS detection circuit, wherein the WAIT state corresponds to a second level of electrical power used by the second plug that is higher than the first level of electrical power used by the second plug;
    with the second controller, placing the second plug in the LFPS state when the second signal type of the different predetermined signal types is being detected by the second EPS detection circuit, wherein the LFPS state corresponds to a third level of electrical power used by the second plug that is higher than the second level of electrical power used by the second plug; and
    with the second controller, placing the second plug in the ACTIVE state when the third signal type of the different predetermined signal types is being detected by the second EPS detection circuit, wherein the ACTIVE state of the second plug corresponds to a fourth level of electrical power used by the second plug that is higher than the third level of electrical power.

11. The method of claim 10, wherein if the second controller determines that the second EPS detection circuit is detecting the first signal type, the second controller determines that the first plug has been plugged into the socket of a USB host.

12. The method of claim 11, further comprising:
in the second controller, determining whether the first plug has been plugged into the socket of the USB host while the second plug is in the SLEEP state, and if so, causing the second plug to exit the SLEEP state and enter the WAIT state.

13. The method of claim 12, wherein the second controller determines that the first plug is transmitting LFPS signals to the second plug by determining whether the second EPS detection circuit is detecting the second signal type, and wherein if the second controller determines that the first plug is transmitting LFPS signals to the second plug while the second plug is in the WAIT state, the second controller causes the second plug to exit the WAIT state and enter the LFPS state.

14. The method of claim 13, wherein the second controller determines that the second EPS detection circuit is detecting the third signal type by determining whether the second EPS detection circuit is detecting high-speed (HS) signals, wherein if the second controller determines that the second EPS detection circuit is detecting HS signals, the second controller determines that the first plug is transmitting HS signals to the second plug.

15. The method of claim 14, further comprising:
in the second controller, determining whether the first plug is transmitting HS signals to the second plug while the second plug is in the LFPS state, and if so, causing the second plug to exit the LFPS state and enter the ACTIVE state.

16. The method of claim 10, wherein the second plug housing is configured to mate with a Universal Serial Bus (USB) socket, and wherein the second socket is a USB socket.

17. The method of claim 1, wherein the first plug housing is configured to mate with a Universal Serial Bus (USB) socket, and wherein the first socket is a USB socket.

18. A method for performing power management in an active optical cable (AOC), the method comprising:
providing an AOC comprising an optical fiber cable and first and second plugs secured to proximal and distal ends, respectively, of the optical fiber cable, the optical fiber cable having at least a first transmit optical fiber having proximal and distal ends and at least a first receive optical fiber having proximal and distal ends, the first and second plugs having first and second plug housings configured to mate with first and second sockets, respectively;
in first and second optical-to-electrical and electrical-to-optical (OE/EO) conversion modules of the first and second plugs, respectively, converting first and second optical signals passing out of the proximal and distal ends, respectively, of the receive and transmit optical fibers, respectively, into first and second electrical signals, respectively;
in first and second electrical power and signal (EPS) detection circuits of the first and second plugs, respectively, detecting the first and second electrical signals, respectively, and outputting first and second electrical output signals, respectively;
in first and second controller of the first and second plugs, respectively, performing respective power management algorithms that process the first and second electrical output signals, respectively, to determine which of a plurality of different predetermined signal types are currently being detected by the first and second EPS detection circuits, respectively;
with the first and second controllers, initially placing the first and second plugs in respective SLEEP states when the first and second plugs are plugged into the first and second USB sockets, respectively, wherein the first and second plugs use respective first levels of electrical power when the first and second plugs are in the respective SLEEP states;
with the first and second controllers, placing the first and second plugs in respective WAIT states when first signal types of the different predetermined signal types are being detected by the first and second EPS detection circuits, wherein the respective WAIT states correspond to respective second levels of electrical power used by the first and second plugs that are higher than the respective first levels of electrical power;
with the first and second controllers, placing the first and second plugs in respective Low Frequency Periodic Signaling (LFPS) states when respective second signal types of the different predetermined signal types are being detected by the first and second EPS detection circuits, wherein the LFPS states correspond to respective third levels of electrical power used by the first and second plugs that are higher than the respective second levels of electrical power; and
with the first and second controllers, placing the first and second plugs in respective ACTIVE states when respective third signal types of the different predetermined signal types are being detected by the first and second EPS detection circuits, wherein the respective ACTIVE states correspond to respective fourth levels of electrical power used by the first and second plugs that are higher than the respective third levels of electrical power.

19. The method of claim 18, wherein the first and second plug housings are configured to mate with first and second Universal Serial Bus (USB) sockets, respectively, and wherein the first and second sockets are a USB socket.

20. The method of claim 19, wherein the respective first levels of electrical power used by the first and second plugs are lowest levels of electrical power used by the first and second plugs, and wherein the respective fourth levels of electrical power used by the first and second plugs are highest levels of electrical power used by the first and second plugs.

* * * * *